United States Patent [19]
Takahashi

[11] Patent Number: 5,907,743
[45] Date of Patent: May 25, 1999

[54] IMAGE HEATING APPARATUS WITH CONTROL FOR PHASE CONTROL OF ALTERNATING CURRENT

[75] Inventor: Masako Takahashi, Yokohama, Japan

[73] Assignee: Canon Kabushiki Kaisha, Tokyo, Japan

[21] Appl. No.: 08/944,643

[22] Filed: Oct. 6, 1997

[30] Foreign Application Priority Data

Oct. 9, 1996 [JP] Japan ..................................... 8-285885

[51] Int. Cl.⁶ .................................................. G03G 15/20
[52] U.S. Cl. ................................................ 399/69; 399/67
[58] Field of Search ............................... 399/67, 69, 328, 399/329; 219/216

[56] References Cited

U.S. PATENT DOCUMENTS

| | | |
|---|---|---|
| 4,162,847 | 7/1979 | Brandon . |
| 4,626,663 | 12/1986 | Tateda . |
| 4,740,671 | 4/1988 | Kuroda et al. . |
| 4,905,051 | 2/1990 | Satoh et al. ............................... 399/69 |
| 5,051,784 | 9/1991 | Yamamoto et al. ..................... 399/329 |
| 5,204,723 | 4/1993 | Hanada et al. .......................... 399/335 |
| 5,321,230 | 6/1994 | Shanklin et al. . |
| 5,376,773 | 12/1994 | Masuda et al. . |
| 5,471,288 | 11/1995 | Ohtsuka et al. . |

FOREIGN PATENT DOCUMENTS

| | | |
|---|---|---|
| 0 295 901 | 12/1988 | European Pat. Off. . |
| 0 373 678 | 6/1990 | European Pat. Off. . |
| 0 668 548 | 8/1995 | European Pat. Off. . |
| 62-150371 | 7/1987 | Japan . |
| 3-27077 | 2/1991 | Japan . |
| 5-35012 | 2/1993 | Japan . |
| 5-224559 | 9/1993 | Japan . |

*Primary Examiner*—Arthur T. Grimley
*Assistant Examiner*—Quana Grainger
*Attorney, Agent, or Firm*—Fitzpatrick, Cella, Harper & Scinto

[57] ABSTRACT

An image heating apparatus has a heating member for heating an image on a recording material, a temperature detecting element for detecting the temperature of the heating member, and an electric power supply controller for phase-controlling an alternating current supplied to the heating member in conformity with the detected temperature by the temperature detecting element. The alternating current supplied to the heating member differs in electric power supply starting phase angle in each half wave.

5 Claims, 7 Drawing Sheets

OUTPUT $= 2f \int_0^{Ton} \sin^2(2\pi ft)dt$

| PREDETERMINED OUTPUT | Ton (mseec) | |
|---|---|---|
| | 50Hz | 60Hz |
| 0% | 10.00 | 8.33 |
| 5% | 8.00 | 6.67 |
| 10% | 7.50 | 6.25 |
| 15% | 7.00 | 5.83 |
| 20% | 6.75 | 5.63 |
| 25% | 6.25 | 5.21 |
| 30% | 6.00 | 5.00 |
| 35% | 5.75 | 4.79 |
| 40% | 5.50 | 4.58 |
| 45% | 5.25 | 4.38 |
| 50% | 5.00 | 4.17 |
| 55% | 4.75 | 3.96 |
| 60% | 4.50 | 3.75 |
| 65% | 4.25 | 3.54 |
| 70% | 4.00 | 3.33 |
| 75% | 3.75 | 3.13 |
| 80% | 3.25 | 2.71 |
| 85% | 3.00 | 2.50 |
| 90% | 2.50 | 2.08 |
| 95% | 2.00 | 1.67 |
| 100% | 0.00 | 0.00 |

IMAGE HEATING APPARATUS WITH CONTROL FOR PHASE CONTROL OF ALTERNATING CURRENT

BACKGROUND OF THE INVENTION

1. Field of the Invention

This invention relates to an image heating apparatus such as a heating-fixing apparatus for use in an image forming apparatus such as a copying apparatus, a printer or a facsimile apparatus, and particularly to an image heating apparatus provided with control means for phase-controlling an alternating current and electrically energizing a heating member.

2. Related Background Art

The fixing apparatus of an image forming apparatus such as a copying apparatus is generally provided with a heater and melts and secures a toner recorded on a recording material such as paper in an image forming portion onto the recording material by the heating of a heater.

This fixing apparatus is provided with an electric power control apparatus for controlling the supply of electric power from an available power source (an AC power source) to the heater to thereby maintain the temperature of the heater at a predetermined temperature.

Now, the power supply controlling method by this electric power control apparatus is divided broadly into wave number control and phase control.

Wave number control is to control electrical power supply by the number of half waves which are turned on. Always the whole of a half wave is turned on. That is, ON is always effected at zero cross (a point at which an alternating current i=0 has been reached).

On the other hand, phase control is to control electric power supply by the area of the ON area of a half wave. That is, ON is effected after the lapse of a certain time from zero cross.

Herein, an electric power control apparatus according to the prior art using phase control will be mentioned as an example and described in detail.

The electric power control apparatus provided in this fixing apparatus has, for example, switching means for switching on/off electricity supplied from a power source to a heater, trigger means for switching on this switching means, temperature detecting means for detecting the temperature of the heater, zero cross detecting means for detecting the zero cross of supplied electric power, and phase control means for determining the ON duty of the power source at each predetermined time on the basis of the difference between the target temperature and the detected temperature of the heater and effecting the switching on of the trigger means at ON timing set after the lapse of a predetermined time from zero cross on the basis of said determination.

So-called PWM control is effected which suitably changes the ON duty of a trigger output signal produced by the trigger means, on the basis of the detected temperature detected by the temperature detecting means to thereby control electric power. Thereby, the control of the electric power supplied to the heater is effected and the temperature of the heater is held at a target temperature suitable for toner fixing.

The waveform of PWM output which detects zero cross and controls the electric power by the phase angle from this zero cross is shown in FIG. 7A of the accompanying drawings. Also, the pattern of the PWM output is shown in FIG. 7B of the accompanying drawings. In FIG. 7B, one ON/OFF is effected within a half wave 10 msec. (here, 50 Hz). Set outputs (predetermined output) 0% to 100% are provided at intervals of 5%, and the ON duty is lengthened in conformity with the levels thereof, whereby the amount of supply of the electric power to the heater is adjusted.

However, according to the prior-art electric power control apparatus described above, it becomes difficult to well effect the temperature control of a fixing apparatus provided with fixing film of small heat capacity.

The fixing apparatus provided with fixing film is provided with fixing film comprising heat resisting film constructed endlessly, a heater disposed inside the fixing film, and a pressing member disposed outside the fixing film.

The fixing film is conveyed while being held between the heater and the pressing member. A recording material is inserted into a fixing nip portion formed between the fixing film and the pressing member, and the heat of the heater is imparted to a toner on the recording material through the fixing film, whereby the toner is melted and fixed on the recording material.

In this fixing apparatus provided with the fixing film, the heat capacities of the heater and the fixing film are set to small values to perform temperature rise quickly. This also means that the resistance value of the heater is small.

When electric power control for this fixing apparatus provided with the fixing film is effected by a conventional electric power control device, there arises the following problem.

Since the heat capacity of the fixing apparatus is small, the temperature condition of the fixing apparatus must be sampled within a relatively short time (e.g., the order of 7 Hz in the prior art) and be PWM-feedback-controlled.

However, the resistance value of the heater is small and therefore, when such wave number control that the heater is always turned on near zero cross is resorted to, there may occur flicker noise. Particularly, when the line impedance of an available power source connected to the fixing apparatus is high, the possibility of flicker noise occurring becomes high.

On the other hand, when phase control is resorted to, the heater is turned on after the lapse of a certain time from zero cross, and this provides an improvement in flicker level. On the other hand, however, it is often the case that the heater is turned on at relatively high potential of a half wave and thus, the occurrence of terminal noise is caused. A countermeasure for this terminal noise becomes necessary, and this leads to the problem that the number of parts is increased and the general construction becomes complicated.

SUMMARY OF THE INVENTION

The present invention has been made in view of the above-noted problems and an object thereof is to provide an image heating apparatus in which terminal noise can be suppressed.

Another object of the present invention is to provide an image heating apparatus in which an alternating current supplied to a heating member for heating an image on a recording material differs in electric power supply starting phase angle in each half wave.

Further objects of the present invention will become apparent when the following detailed description is read in conjunction with the accompanying drawings.

DESCRIPTION OF THE PREFERRED EMBODIMENTS

Some preferred embodiments of the present invention will hereinafter be described with reference to the drawings.
(First Embodiment)

A first embodiment of the electric power control portion of the image heating apparatus of the present invention will hereinafter be described with reference to FIGS. 1 and 2.

Figure 1:
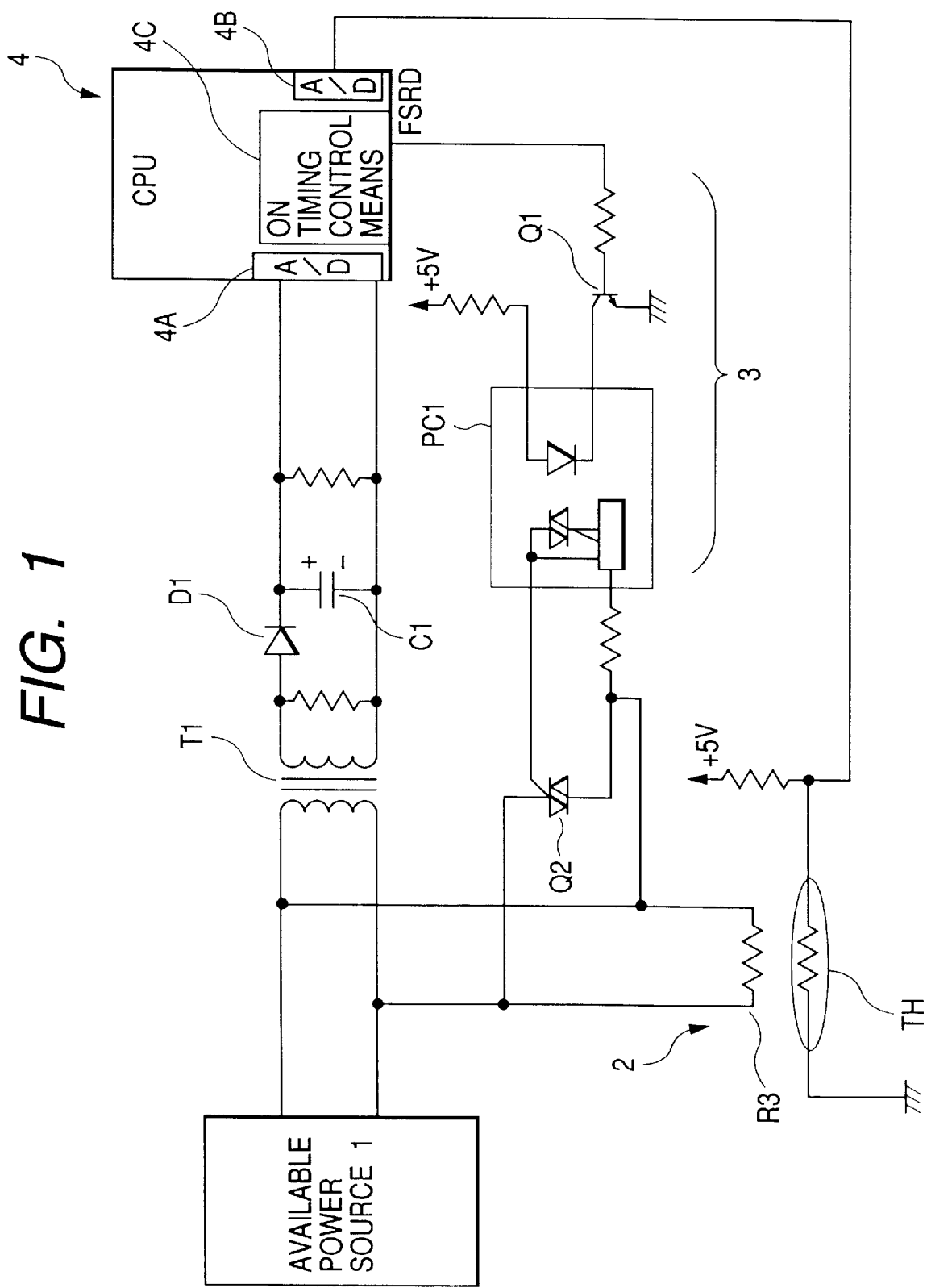
FIG. 1 a circuit diagram of a first embodiment of the electric power control apparatus of the present invention.
Figure 2:
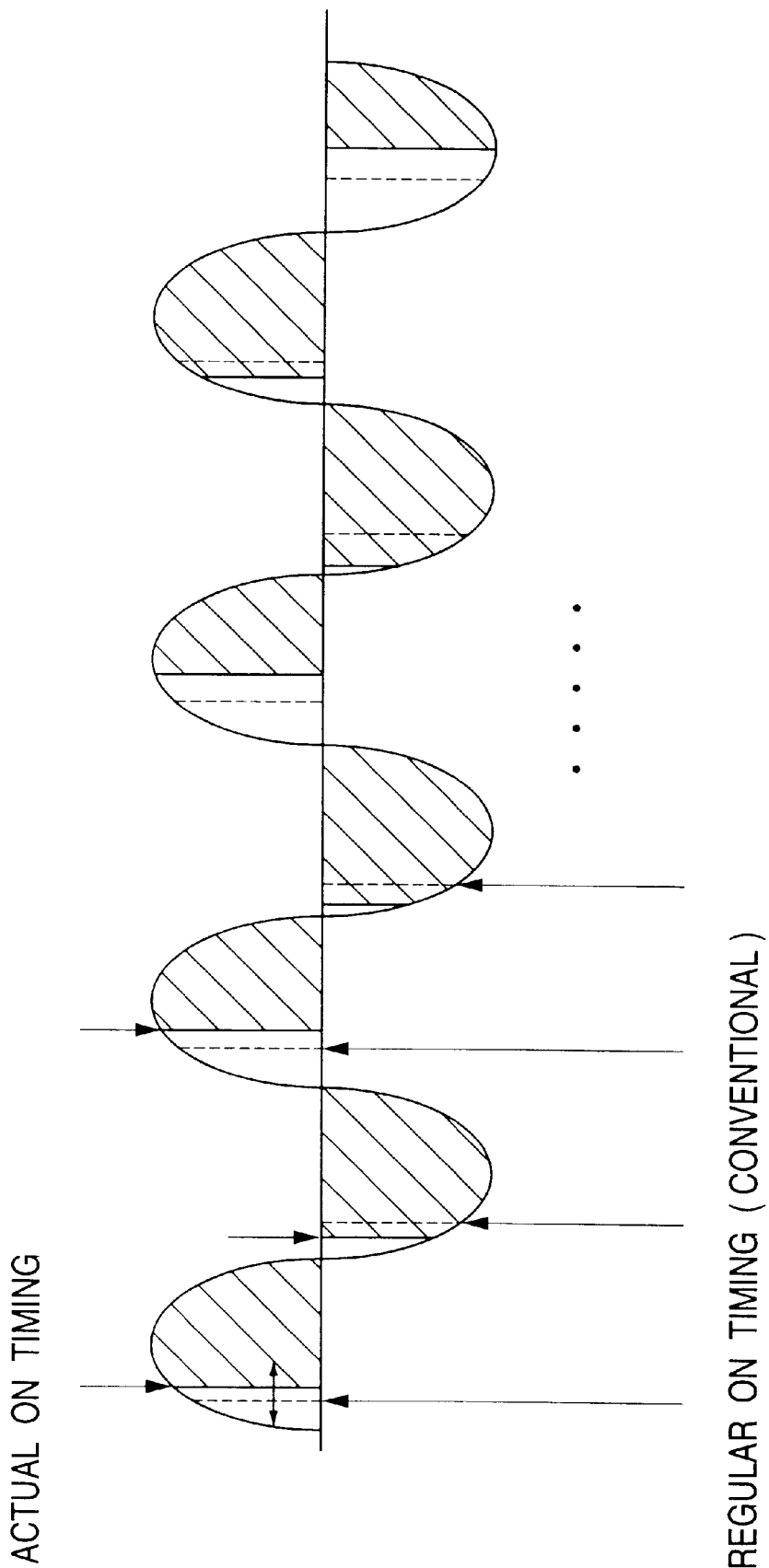
FIG. 2 a voltage waveform graph illustrating the ON timing by the electric power control apparatus of FIG. 1.
Figure 3:
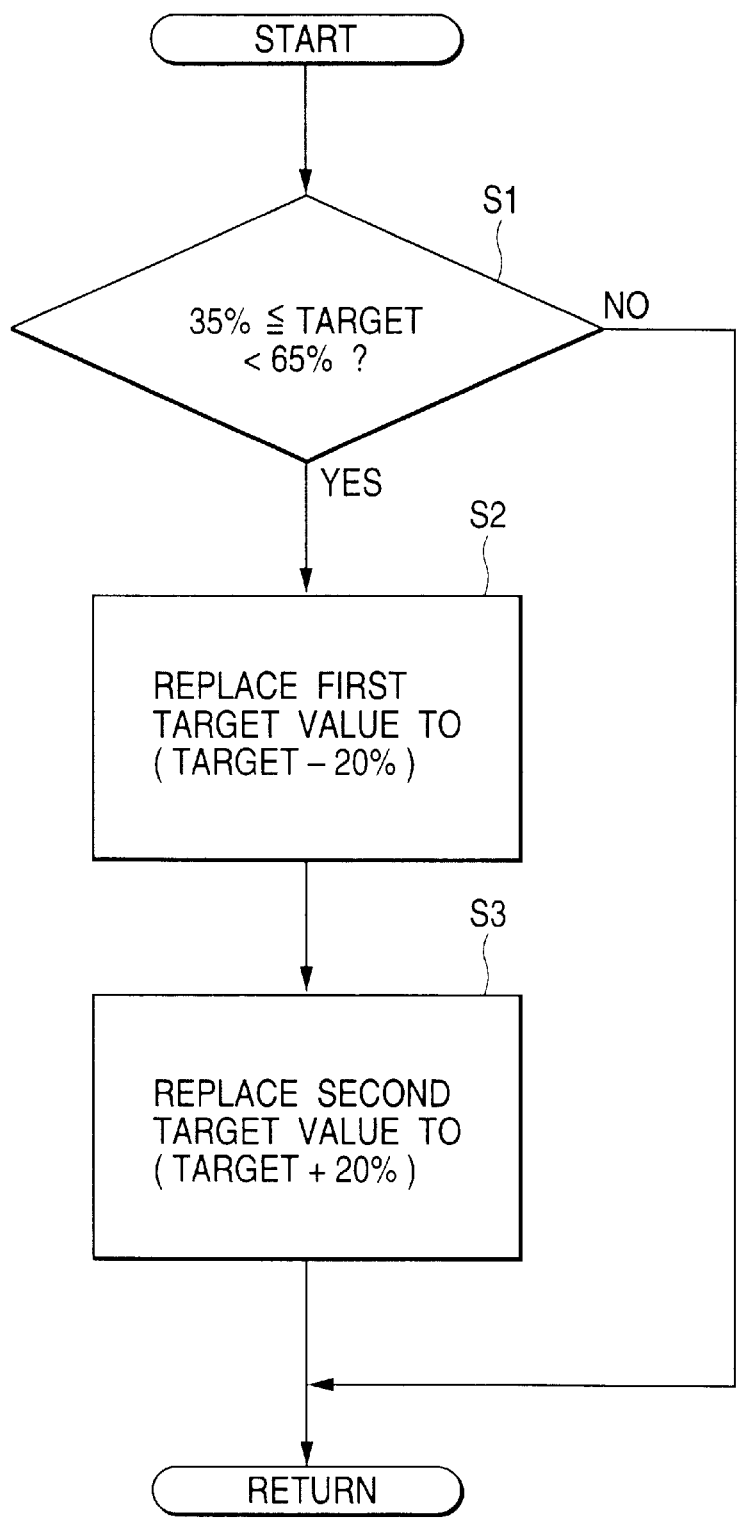
FIG. 3 a flow chart showing the ON timing control of a second embodiment of the electric power control apparatus of the present invention.

FIG. 1 shows a schematic system diagram when a first embodiment of the electric power control apparatus is used in the fixing apparatus of a copying apparatus or the like.

As a fixing apparatus 2, one provided with fixing film is mentioned in the present embodiment. This fixing apparatus provided with the fixing film is provided with fixing film comprising heat resisting film endlessly constructed, a heater (heating member) disposed inside the fixing film, and a pressing member disposed outside the fixing film. Here, the fixing apparatus 2 is shown as being provided with only a heater (ceramic heater R3). The ceramic heater R3 will hereinafter be simply referred to as the heater R3.

A recording material is inserted into a fixing nip portion formed between the fixing film and the pressing member, and the heat of the heater is imparted to a toner on the recording material through the fixing film, whereby the toner is melted and fixed on the recording material.

In this fixing apparatus provided with the fixing film, the heat capacities of the heater R3 and the fixing film are set to small values to perform temperature rise quickly.

It is the electric power control apparatus of the present invention that can well effect the temperature control of even a fixing apparatus utilizing such fixing film of small heat capacity.

First, the present invention basically is phase control and therefore, unlike wave number control which is always switched on at zero cross, flicker noise can be prevented. Further, in the phase control of the present invention, ON timing is controlled so that electric power supply may be switched on when the potential of the supplied electric power is as low as possible and therefore, terminal noise can be prevented.

This electric power control apparatus is provided with a triac Q2 which is switching means for switching on/off electric power supplied from an available power source 1 to the heater R3 which is the object of control, a transistor Q1 and a phototriac PC1 which together constitute trigger means 3 for switching on the triac Q2, a thermistor TH which is control result value detecting means for detecting the control result value (temperature) of the heater R3, a transformer T1, a diode D1 and a hold capacitor C1 which together constitute zero cross detecting means for detecting the zero cross of the electric power supplied from the available power source 1 and monitor the voltage of the available power source 1, and a CPU 4 which is electric power supply control means for controlling the electric power supply by a phase control system to maintain the temperature of the heater R3 at a control target value.

The substance of the control by the CPU 4 is as follows.

First, the ON duty of the available power source 1 is determined at each predetermined time on the basis of the difference between the control target value (target temperature) and the control result value (detected temperature of the heater R3. Then, the switching on of the trigger means 3 (the transistor Q1 and the phototransistor PC1) is effected at the ON timing after the lapse of a time from the zero cross based on the determination of this ON duty. The switching on of this trigger means 3 is effected by the CPU 4 supplying FSRD signal to the transistor Q.

In the present invention, the function by ON timing control means 4C is added to this.

For example, duty down or duty up in such a form as −a1%, +a1%, −a1%, +a1%, . . . is repeated (+0 may be entered) for the desired ON duty A by the difference between the temperature detection result of the heater R3 by the thermistor TH and the control target temperature so that duty conversion may be effected for each half wave. That is, for example, FSRD signals for (A−a1)%, (A+a1)%, (A−a1)%, (A+a1)%, . . . are successively switched on for each half wave, and this process is continued until the result of sampling changes.

In the present embodiment, it is to be understood that conversion is effected for each half wave in the order of −5%, +5%, −5%, +5%, . . . for desired ON duty A.

As described above, control is effected so that the ON timing of each half wave may not always be primarily decided upon for the desired ON duty. That is, switching on is effected when the half wave of the supplied electric power is at a low voltage, whereby a reduction in terminal noise is achieved.

Also, the electric power from the available power source 1 to the heater R3 begins to be supplied when the FSRD signal is ON (H level), and the supply is stopped when the FSRD signal is OFF (L level).

When the ON timing control means 4C of the CPU 4 switches on the FSRD signal (H level), the transistor Q1 is turned on, and the phototransistor PC1 is turned on by the collector output of this transistor Q1 and further, the gate of the triac Q2 is turned on, whereby the supply of the electric power from the available power source 1 to the heater R3 is started.

On the other hand, when the FSRD signal is OFF (L level), the transistor Q1, the phototransistor PC1 and the gate of the triac Q2 are turned off, whereby the supply of the electric power from the available power source 1 to the heater R3 is stopped.

According to the electric power control apparatus constructed as described above, phase timing is controlled as follows and terminal noise is reduced.

The heater R3 generates heat by the electric power supplied from the available power source 1. The temperature of this heater R3 is detected by the thermistor TH and the detection signal thereof is inputted from an A/D input port 4B to the CPU 4. Thus, the CPU 4 monitors the temperature of the heater R3 by the thermistor TH. The CPU 4 determines ON duty from the difference between this detected temperature and the control target temperature.

On the other hand, the voltage of the available power source 1 is transformed by a transformer T1, and the hold capacitor C1 is charged by this transformed voltage through the diode D1, and the voltage of this hold capacitor C1 is inputted to the A/D input port 4A of the CPU 4. Thus, the CPU 4 monitors the voltage of the available power source 1. For example, it detects the zero cross of the voltage of the available power source 1.

It is to be understood here that one sampling is effected by a half wave. That is, it is to be understood that ON duty is determined by the detected temperature for each half wave.

Let it be assumed that from the temperature detection result of the thermistor TH, the ON duty is 70% duty. It is to be understood that at this time, in the present embodiment, the ON timing control means 4C of the CPU 4 effects conversion in the order of −5%, −5%, +5%, +5%, . . . for 70% duty for each half wave as in FIG. 2. In each wave, the FSRD signal is switched on at the timing after the conversion, and this process is continued until the result of sampling changes (in the present embodiment, sampling is effected for a half wave).

Thereby, the temperature control of substantially 70% duty is realized while the terminal noise is reduced.

(Second Embodiment)

A second embodiment of the electric power control apparatus of the present invention will now be described with reference to FIGS. 1, 3, 4A and 4B.

The construction of this embodiment is generally similar to that of the first embodiment and therefore, reference is had to the block diagram of FIG. 1 used for the description of the first embodiment. In the construction of FIG. 1, the control of ON timing will be described with reference to the flow chart of FIG. 3.

The CPU 4 determined the ON duty from the difference between the temperature sampling-detected by the thermistor TH and the control target temperature (This is similar to the first embodiment). In the phase timing control means 4C in the present embodiment, phase control similar to that in the prior art (i.e., the control in which the electric power supply starting phase angle is constant) is effected when the ON duty is outside a predetermined range (e.g., equal to or greater than 35% and less than 65%) which is high potential, while the ON timing (the electric power supply starting phase angle) is changed and phase control is effected when the ON duty is within this predetermined range (see S1).

When the ON duty is outside the predetermined range, the potential is low and therefore the possibility of terminal noise is low and thus, switching on may be intactly effected. That is, the ON duty determined by the CPU 4 on the basis of the temperature detected by the thermistor TH directly becomes ON timing. With the ON duty left as it is, the FSRD signal is outputted and is phase-controlled.

In contrast, when the ON duty is within a range of high potential, the ON timing is shifted to low potential and the terminal noise is avoided. That is, when the ON duty is within a predetermined range, −c%, (e.g., −20%) subtracted from the desired ON duty (target) is defined as a first duty (a first target value) (S2). Also, +c% (e.g., +20%) added to the ON duty (target) is defined as a second duty (a second target value) (S3). These first and second duties are alternately applied until the detected temperature changes.

Figure 4A:
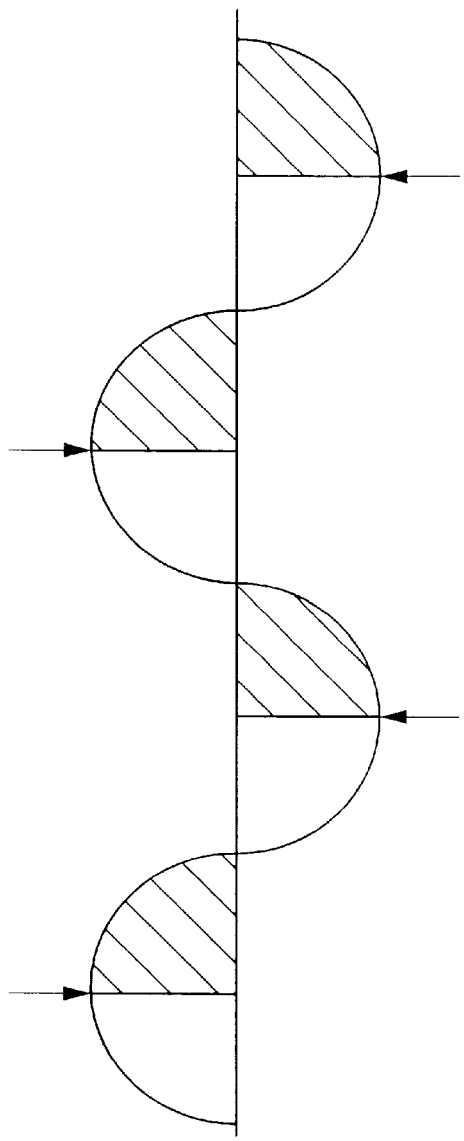
FIGS. 4A and 4B are voltage waveform graphs by the electric power control apparatus, FIG. 4A being a waveform graph showing a case where the apparatus has been switched on with ON duty left as it is, and FIG. 4B being a waveform graph showing a case where the apparatus has been switched on by the ON timing control of the flow art of FIG. 3.
Figure 4B:
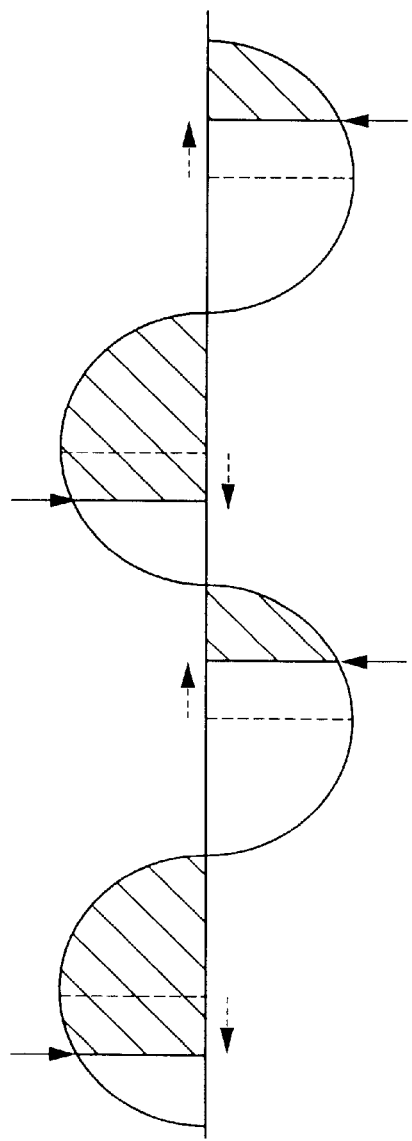

The control when the desired ON duty is 50% is shown in FIGS. 4A and 4B. FIG. 4A is a waveform graph when in the prior art, switching on has been effected with the ON duty 50% kept as it is.

On the other hand, FIG. 4B is a waveform graph when switching on has been effected on the basis of the control of the present embodiment. As shown, for example, in the first wave, the first duty is 50%−20%, i.e., 30%. Also, as shown, for example, in the second wave, the second duty is 50%+ 20%, i.e., 70%. Control is effected alternately by 30% and 70%, whereby temperature control of substantially 50% duty is realized while the terminal noise is suppressed.

(Third Embodiment)

Figure 5:
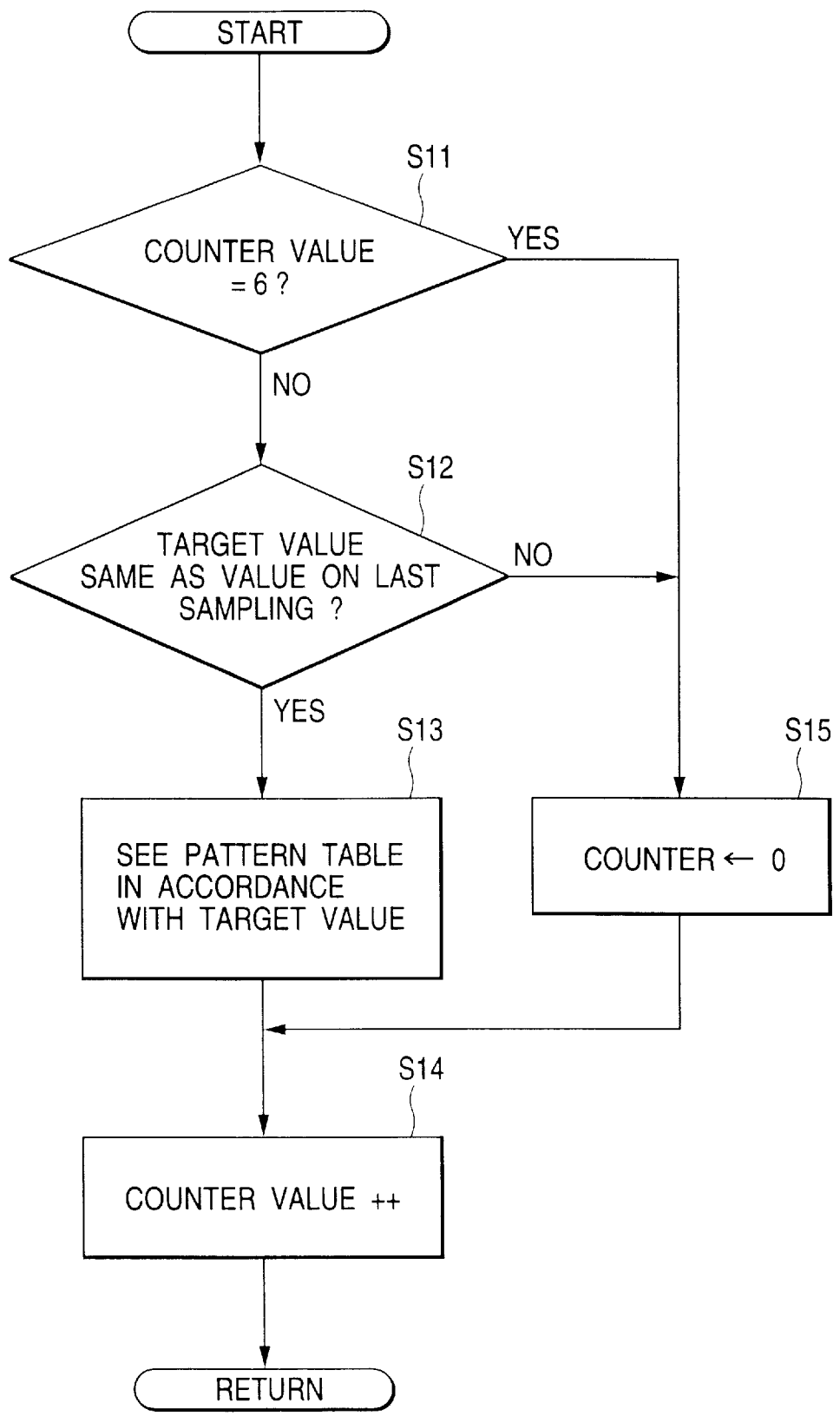
FIG. 5 is a flow chart showing the ON timing control of a third embodiment of the electric power control apparatus of the present invention.

A third embodiment of the electric power control apparatus of the present invention will now be described with reference to FIGS. 1, 5 and 6.

The construction of this embodiment is generally similar to that of the first embodiment and therefore, reference is had to the block diagram of FIG. 1 used for the description of the first embodiment.

In the present embodiment, six half waves form one cycle, and provision is made of a counter (not shown) for representing what half wave in that one cycle. At each detected temperature, correspondingly thereto, an output pattern of one cycle and six half waves is tabulated. This pattern is set so that the average value of six half waves may become equal to the desired ON duty conforming to the detected temperature.

Figure 6:
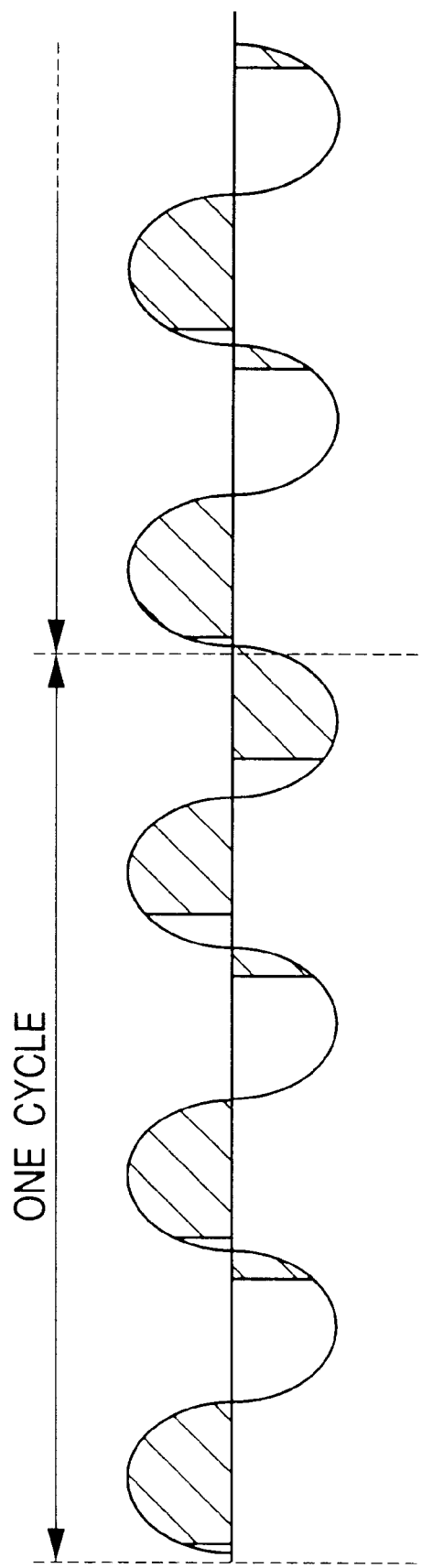
FIG. 6 is a voltage waveform graph by the electric power control apparatus FIG. 5.

For example, in one cycle (six half waves) of a timing chart shown in FIG. 6, design is made such that the average value of six half waves becomes the same as the desired ON duty. Also, the potential at a point of time whereat each wave is ON is set so as to be as low as possible, thereby preventing the terminal noise.

The control of the ON timing in the present embodiment will now be described with reference to the flow chart of FIG. 5.

Counting is effected by the counter with six half waves as one cycle (S14, S11, S15). Table reference based on a desired target value (ON duty) is made to thereby determine each wave pattern (S13).

When the target value (ON duty) changes during one cycle, the counter is cleared on the spot and start is effected from the first wave in a new cycle (S12, S15). Thereby, control of good responsiveness can be accomplished.

The present invention is not restricted to the above-described embodiments, but various modifications are possible.

What is claimed is:

1. An image heating apparatus comprising:
    a heating member for heating an image on a recording material;
    a temperature detecting element for detecting a temperature of said heating member; and
    electric power supply control means for phase-controlling an alternating current supplied to said heating member so that the temperature detected by said temperature detecting element is maintained at a set temperature;
    wherein the alternating current supplied to said heating member differs in electric power supply starting phase angle thereof in each half wave.

2. An image heating apparatus according to claim 1, wherein said electric power supply control means shifts a predetermined electric power supply starting phase angle corresponding to the detected temperature by said temperature detecting element in each half wave.

3. An image heating apparatus according to claim 1, wherein said electric power supply control means shifts the electric power supply starting phase angle in each half wave only when a predetermined electric power supply starting phase angle corresponding to the detected temperature is within a predetermined range.

4. An image heating apparatus according to claim 1, wherein said electric power supply control means shifts the electric power supply starting phase angle in each half wave so that a total electric power supply which is a predetermined times as great as the half wave of the alternating current actually supplied to said heating member may become an electric power supply duty at a predetermined phase angle corresponding to the detected temperature.

5. An image heating apparatus according to claim 1, further comprising a film slidingly contacts with said heating member while moving together with the recording material, and a backup member forming a nip cooperating with said heating member, the image on the recording material being heated by the heat generated by said heating member through said film.

\* \* \* \* \*

UNITED STATES PATENT AND TRADEMARK OFFICE
CERTIFICATE OF CORRECTION

PATENT NO. : 5,907,743

DATED : May 25, 1999

INVENTOR(S) : MASAKO TAKAHASHI

It is certified that error appears in the above-identified patent and that said Letters Patent is hereby corrected as shown below:

COLUMN 3,
Line 11, "art" should read --chart--.

COLUMN 4,
Line 18, "ture" should read --ture)--.

COLUMN 5,
Line 39, "sampling-detected" should read --sampling detected--.

COLUMN 7,
Line 8, "mined" should read --mined number of--; and
Line 9, "may-" should be deleted.

COLUMN 8,
Line 1, "become" should read --becomes--; and "duty" should be deleted.

UNITED STATES PATENT AND TRADEMARK OFFICE
CERTIFICATE OF CORRECTION

PATENT NO. : 5,907,743

DATED : May 25, 1999

INVENTOR(S) : MASAKO TAKAHASHI

Figures 7A, 7B:
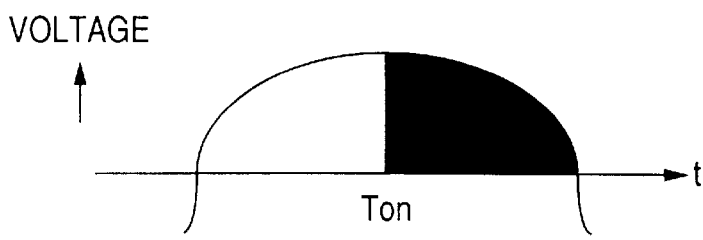
FIGS. 7A and 7B illustrate ON duty, FIG. 7A being a waveform graph showing an output, and FIG. 7B being a table showing predetermined outputs and ON duty for each frequency of an available power source corresponding thereto.

It is certified that error appears in the above-identified patent and that said Letters Patent is hereby corrected as shown below:

SHEET 7,
Figure 7B, "(mseec)" should read --msec--.

Signed and Sealed this

Ninth Day of November, 1999

Q. TODD DICKINSON

*Attest:*

*Attesting Officer*   Acting Commissioner of Patents and Trademarks